United States Patent
Lacaze et al.

(10) Patent No.: US 11,086,019 B2
(45) Date of Patent: Aug. 10, 2021

(54) ATOMIC CLOCK BASE NAVIGATION SYSTEM FOR ON-THE-MOVE RADAR, OBFUSCATION, SENSING, AND AD-HOC THIRD PARTY LOCALIZATION

(71) Applicant: Robotic Research, LLC, Gaithersburg, MD (US)

(72) Inventors: Alberto Daniel Lacaze, Potomac, MD (US); Karl Nicholas Murphy, Rockville, MD (US); Raymond Paul Wilhelm, III, Gaithersburg, MD (US)

(73) Assignee: Robotic Researchh, LLC, Clarksburg, MD (US)

( * ) Notice: Subject to any disclaimer, the term of this patent is extended or adjusted under 35 U.S.C. 154(b) by 313 days.

(21) Appl. No.: 15/175,094

(22) Filed: Jun. 7, 2016

(65) Prior Publication Data
US 2018/0003826 A1    Jan. 4, 2018

Related U.S. Application Data

(60) Provisional application No. 62/175,207, filed on Jun. 12, 2015.

(51) Int. Cl.
| | |
|---|---|
| *G01S 19/01* | (2010.01) |
| *G01S 7/38* | (2006.01) |
| *G04F 5/14* | (2006.01) |
| *G01S 13/00* | (2006.01) |
| *G01S 13/87* | (2006.01) |

(Continued)

(52) U.S. Cl.
CPC .......... *G01S 19/015* (2013.01); *G01S 7/006* (2013.01); *G01S 7/38* (2013.01); *G01S 13/003* (2013.01); *G01S 13/878* (2013.01); *G04F 5/14* (2013.01); *G01S 19/23* (2013.01)

(58) Field of Classification Search
CPC .......... G01S 19/015; G01S 19/23; G01S 7/38; G01S 13/003; G04F 5/14
USPC .......................................................... 342/14
See application file for complete search history.

(56) References Cited

U.S. PATENT DOCUMENTS

| | | | | |
|---|---|---|---|---|
| 3,891,989 A | * | 6/1975 | Barney | G01S 7/36 342/15 |
| 4,467,328 A | * | 8/1984 | Hacker | G01S 7/38 342/14 |

(Continued)

FOREIGN PATENT DOCUMENTS

DE      2796895    *   4/2013

*Primary Examiner* — Timothy X Pham
(74) *Attorney, Agent, or Firm* — RowanTree Law Group, PLLC; Carson C. K. Fincham

(57) ABSTRACT

Atomic clocks (at both the receiver and emitter) are used to obfuscate the location of the receiver by providing a different mechanism to synchronize (other than the direct reception). Using this approach, there is no need for the emitter to emit directly to the receiver; only the reflection is necessary, and therefore, the location of the receiver (or receivers) is better obfuscated. Phased antenna arrays are used in RADAR for a variety of applications, including steering of beams and increasing the "aperture" of the antenna for Synthetic Aperture Radar (SAR). The relative position of the emitters is known by means of using a Navigation unit. The beam-steering phase shifts are dynamically computed using the position of the emitters, and the atomic clock is used to synchronize the phase shifts.

7 Claims, 4 Drawing Sheets

(51) Int. Cl.
*G01S 7/00* (2006.01)
*G01S 19/23* (2010.01)

(56) References Cited

U.S. PATENT DOCUMENTS

| | | | | |
|---|---|---|---|---|
| 6,320,507 B1* | 11/2001 | Strzelec | ............ | G08B 13/2488 340/10.1 |
| 10,509,130 B2* | 12/2019 | Snyder | ................... | H04K 3/224 |
| 2005/0104769 A1* | 5/2005 | Tietjen | ..................... | H01Q 3/08 342/174 |
| 2005/0168375 A1* | 8/2005 | Halladay | ................... | G01S 7/38 342/14 |
| 2007/0080847 A1* | 4/2007 | Gounalis | ................. | G01S 7/021 342/13 |
| 2008/0186235 A1* | 8/2008 | Struckman | ............ | G01S 5/0221 342/465 |
| 2009/0102705 A1* | 4/2009 | Obermeyer | ............. | G01S 13/90 342/25 F |
| 2009/0111483 A1* | 4/2009 | Fiereizen | ................... | G01S 1/08 455/456.1 |
| 2010/0013697 A1* | 1/2010 | De Waard | ............... | G01S 13/66 342/59 |
| 2011/0287779 A1* | 11/2011 | Harper | .................. | H04W 4/025 455/456.1 |
| 2012/0053757 A1* | 3/2012 | Breshears | ............. | G01S 5/0081 701/2 |
| 2014/0062753 A1* | 3/2014 | Grooters | ................. | G01S 7/023 342/21 |
| 2014/0266897 A1* | 9/2014 | Jakoby | ..................... | H01Q 1/38 342/368 |
| 2015/0188695 A1* | 7/2015 | Crowell | ................. | H04B 11/00 398/155 |
| 2015/0236778 A1* | 8/2015 | Jalali | ................... | H04B 7/18528 370/316 |

\* cited by examiner

ATOMIC CLOCK BASE NAVIGATION SYSTEM FOR ON-THE-MOVE RADAR, OBFUSCATION, SENSING, AND AD-HOC THIRD PARTY LOCALIZATION

CROSS REFERENCE TO RELATED APPLICATIONS

This Application claims priority from U.S. Patent Application Ser. No. 62/175,207, entitled "ATOMIC CLOCK BASE NAVIGATION SYSTEM FOR ON-THE-MOVE RADAR, OBFUSCATION, SENSING, AND AD-HOC THIRD PARTY LOCALIZATION", filed on 12 Jun. 2015. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to atomic clock based navigation systems. More specifically, the present invention relates to atomic clock based navigation systems for on-the-move RADAR.

BACKGROUND OF THE INVENTION

Although there are a variety of RADAR methodologies available, they all possess a similar, overall technique. For each methodology, an emitter radiates a particular RF signal; when the signal reaches a target, it is reflected by the target; and the reflection is sensed by a receiver. Correlations between the outgoing and incoming signal are processed in various ways, depending on the RADAR technology (for example, Doppler).

Another difference between RADAR systems is whether the emitter and receiver are co-located or not. The first case is a monostatic (or pseudostatic) RADAR; the second case (when there is distance between the emitter and the receiver) is a bistatic RADAR. Most RADARs used commercially, and by the DoD, are monostatic in nature.

One of the disadvantages of monostatic RADARs is that the location of the receiver is given away by the emitter. In other words, the target not only knows that it is being pinged, it knows the location of the receiver. In the case of the bistatic (or multistatic with multiple non-collocated receivers) RADAR, the location of the receiver is not as easily determined.

However, since the exact time at which the emitter has emitted the RF is not known by the receiver, the receiver needs a mechanism for computing this time, in order to get the distance to the target. This is usually performed by having the emitter receive the "direct" emission from the emitter, and then comparing it with the "reflected" emission. Then, by knowing the location of the emitter (with respect to the receiver), the receiver can compute the distance to the target by "subtracting" the time-of-flight from the emitter to the receiver.

This method has been performed under a variety of conditions. However, it forces the emitter to emit a beam, which the receiver can directly sense. The main problem with this approach is that the location of the receiver may be disclosed by the reflection of the emitter on the receiver. In other words, a smart target can receive the direct signal from the emitter, followed by the reflected signal from the receiver; it is thereby able to discover direction and some distance information from both receiver and emitter.

Definitions

An atomic clock is a clock device that uses an electronic transition frequency in the microwave, optical, or ultraviolet region of the electromagnetic spectrum of atoms as a frequency standard for its timekeeping element. Atomic clocks are the most accurate time and frequency standards known, and are used as primary standards for international time distribution services, to control the wave frequency of television broadcasts, and in global navigation satellite systems such as GPS.

An inertial navigation system (INS) is a navigation aid that uses a computer, motion sensors (accelerometers) and rotation sensors (gyroscopes) to continuously calculate via dead reckoning the position, orientation, and velocity (direction and speed of movement) of a moving object without the need for external references. It is used on vehicles such as ships, aircraft, submarines, guided missiles, and spacecraft. Other terms used to refer to inertial navigation systems or closely related devices include inertial guidance system, inertial reference platform, inertial instrument, inertial measurement units (IMU) and many other variations.

LADAR (also known as LIDAR) is an optical remote sensing technology that can measure the distance to, or other properties of a target by illuminating the target with light, often using pulses from a laser. LIDAR technology has application in geomatics, archaeology, geography, geology, geomorphology, seismology, forestry, remote sensing and atmospheric physics, as well as in airborne laser swath mapping (ALSM), laser altimetry and LIDAR contour mapping. The acronym LADAR (Laser Detection and Ranging) is often used in military contexts. The term "laser radar" is sometimes used, even though LIDAR does not employ microwaves or radio waves and therefore is not radar in the strict sense of the word.

In computing, a graphical user interface (GUI, commonly pronounced gooey) is a type of user interface that allows users to interact with electronic devices using images rather than text commands. GUIs can be used in computers, hand-held devices such as MP3 players, portable media players or gaming devices, household appliances and office equipment. A GUI represents the information and actions available to a user through graphical icons and visual indicators such as secondary notation, as opposed to text-based interfaces, typed command labels or text navigation. The actions are usually performed through direct manipulation of the graphical elements.

The terms location and place in geography are used to identify a point or an area on the Earth's surface or elsewhere. The term location generally implies a higher degree of certainty than place, which often indicates an entity with an ambiguous boundary, relying more on human/social attributes of place identity and sense of place than on geometry.

An "absolute location" is designated using a specific pairing of latitude and longitude in a Cartesian coordinate grid—for example, a Spherical coordinate system or an ellipsoid-based system such as the World Geodetic System—or similar methods. Absolute location, however, is a term with little real meaning, since any location must be expressed relative to something else. For example, longitude is the number of degrees east or west of the Prime Meridian, a line arbitrarily chosen to pass through Greenwich, London. Similarly, latitude is the number of degrees north or south of the Equator. Because latitude and longitude are expressed relative to these lines, a position expressed in latitude and longitude is actually a relative location.

A "relative location" is described as a displacement from another site.

A satellite navigation or satnav system is a system of satellites that provide autonomous geo-spatial positioning with global coverage. It allows small electronic receivers to determine their location (longitude, latitude, and altitude) to high precision (within a few meters) using time signals transmitted along a line of sight by radio from satellites. The signals also allow the electronic receivers to calculate the current local time to high precision, which allows time synchronization. A satellite navigation system with global coverage may be termed a global navigation satellite system (GNSS).

SUMMARY OF THE INVENTION

The combination of localization and time synchronization between the clocks is used to provide a variety of benefits, including improved on-the-move radar techniques, obfuscation, and third-party localization services on-the-move.

In the present invention, atomic clocks (at both the receiver and emitter) are used to obfuscate the location of the receiver by providing a different mechanism to synchronize (other than the direct reception). Using this approach, there is no need for the emitter to emit directly to the receiver; only the reflection is necessary, and therefore, the location of the receiver (or receivers) is better obfuscated.

The advantages of the proposed system are important in a variety of applications. For example, a drone can be used to emit the RADAR signal, allowing a group of friendly planes to sense their surroundings without having to emit themselves, and therefore disclose their location to the enemy.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

In the present invention, atomic clocks (at both the receiver and emitter) are used to obfuscate the location of the receiver by providing a different mechanism to synchronize (other than the direct reception). Using this approach, there is no need for the emitter to emit directly to the receiver; only the reflection is necessary, and therefore, the location of the receiver (or receivers) is better obfuscated.

The advantages of the proposed system are important in a variety of applications. For example, a drone can be used to emit the RADAR signal, allowing a group of friendly planes to sense their surroundings without having to emit themselves, and therefore disclose their location to the enemy.

Phased antenna arrays are used in RADAR for a variety of applications, including steering of beams and increasing the "aperture" of the antenna for Synthetic Aperture Radar (SAR). However, the relative location of the emitter members of the array are usually fixed, and known a-priori.

In other words, since the position of the emitters and the receivers dictate the beam-forming and steering characteristics of the array, they need to be known and synchronized. In the present invention, the relative position of the emitters is known by means of using a Navigation unit. The beam-steering phase shifts are dynamically computed using the position of the emitters, and the atomic clock is used to synchronize the phase shifts.

For example, this technique can be used by a convoy of trucks carrying a navigations unit with the atomic clock synchronization. Using this method, the convoy becomes a large aperture antenna, with a wide range of beam-steering capabilities.

Figure 1:
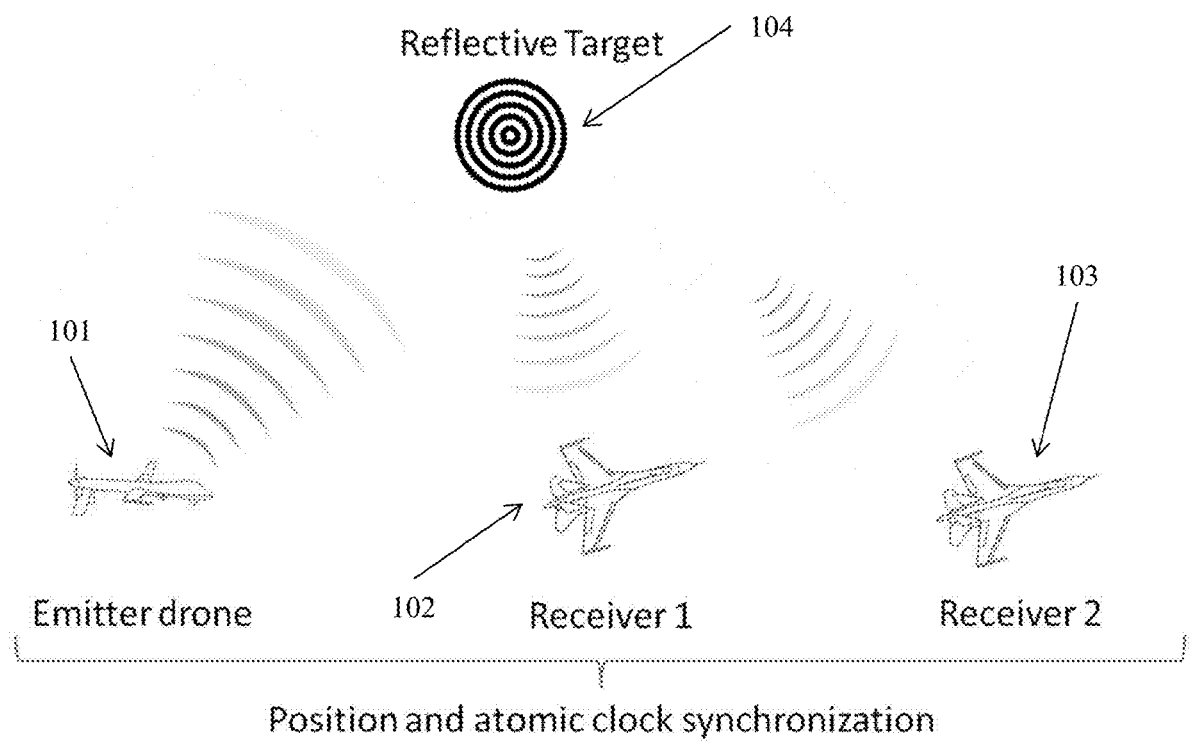
FIG. 1. By synchronizing time and knowing relative positioning, the location of the receiver is better obfuscated to the target.

FIG. 1 illustrates where by synchronizing time and knowing relative positioning of receivers 101, 102, and 103, the location of the receivers 101, 102, and 103 is better obfuscated to the target 104.

A variety of arrays can be implemented following this idea including: linear arrays, planar arrays, frequency scanning arrays, and others. The importance of the system lies in the mobile emitters, the characteristics of which—including aperture of the array—can be modified by changing the formation of the emitters.

The invention can be used with ground, water, air, or space vehicles, as well as a mixture of all these types.

Figure 2:
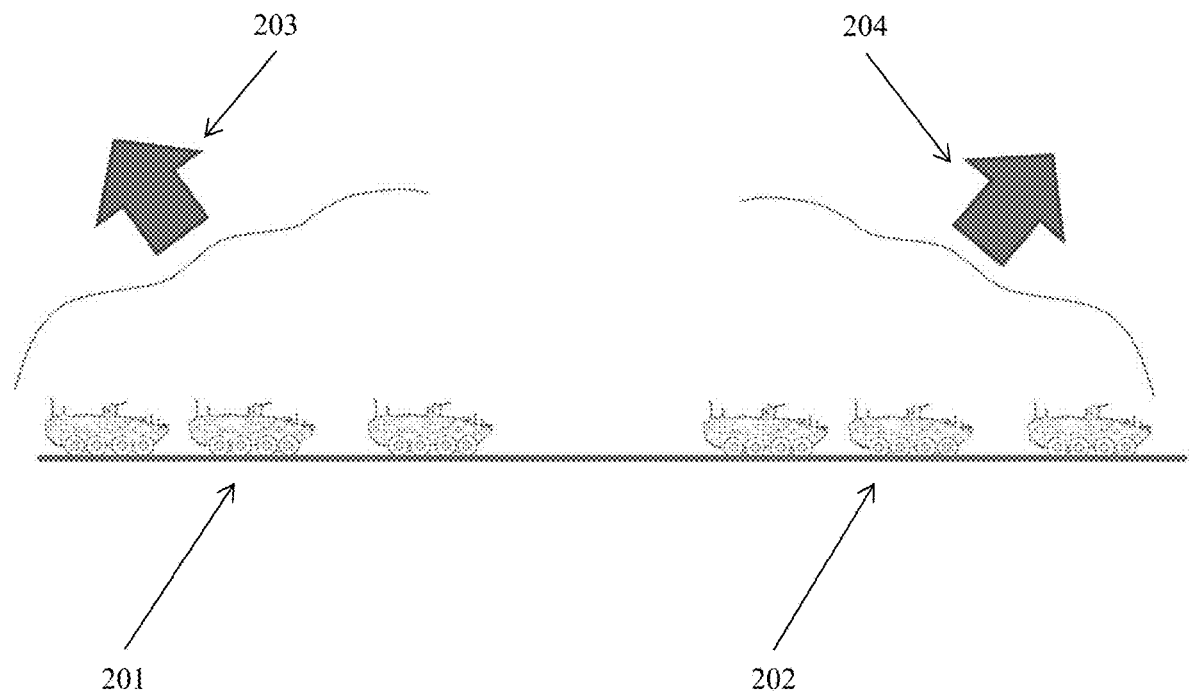
FIG. 2. By synchronizing time and knowing relative positioning, beam-steering is possible from a group of moving platforms.

FIG. 2 illustrates where by synchronizing time and knowing relative positioning, beam-steering is possible from a group of moving platforms 201 and 202.

A variation of this method can be used where a signal is NOT transmitted toward the target, but the natural emissions 203 and 204 of the targets or moving platforms 201 and 202 are used instead. Theses emissions could be communication transmissions, RF "noise" possibly from an electric motor, heat radiation, reflected light, acoustic noise, etc. These emissions can be received by two or more receivers (or sensors) at different locations. The measurements can be synchronized accurately using atomic clocks at each receiver to determine the target location. The receivers can be stationary, or moving.

If the receiver can measure heading to the targets or moving platforms 201 and 202, then two receivers can be used to determine the target's position. If receivers only measure the time the signal arrived, then the difference in range to two receivers can be determined.

Figure 3:
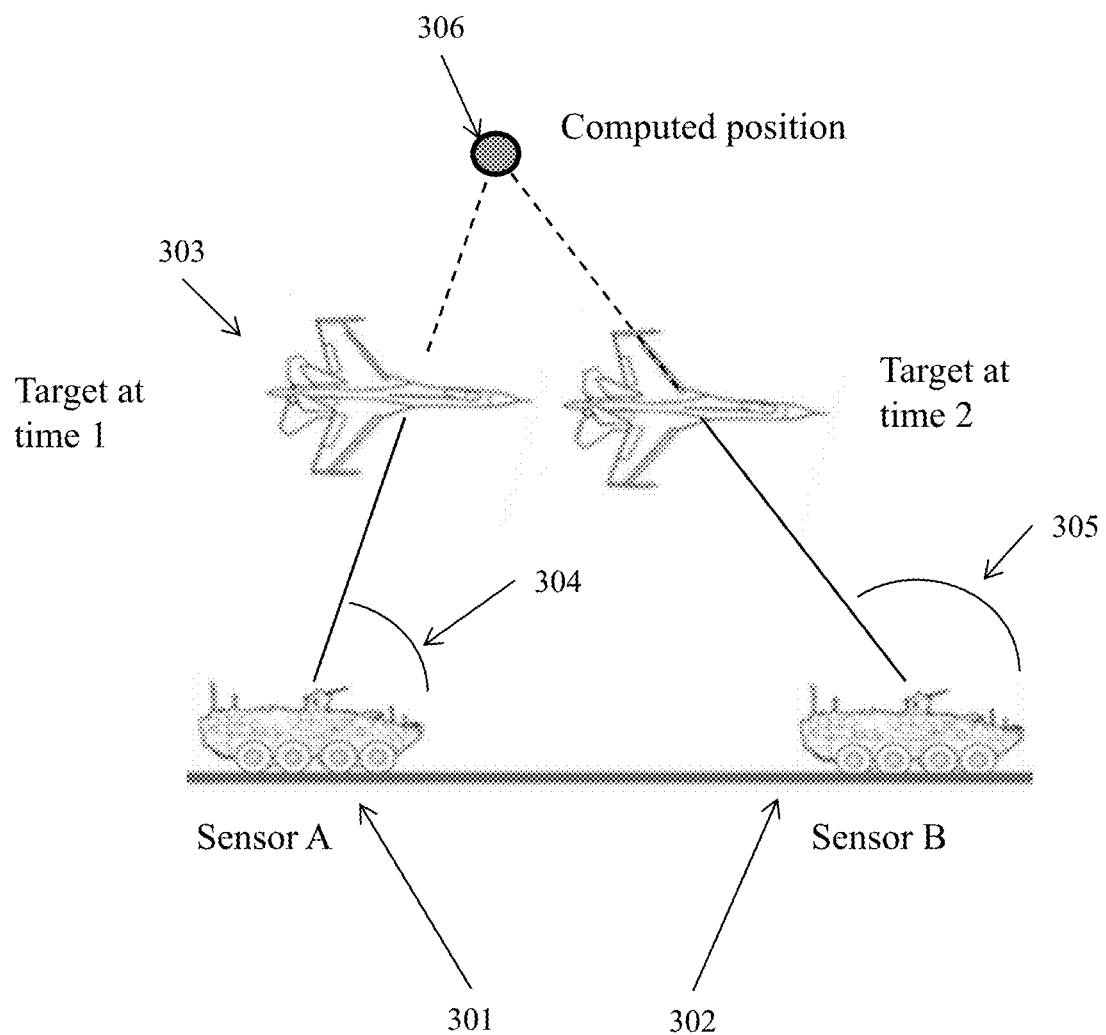
FIG. 3. The two sensors, possibly a camera, can measure angle to a target but not range. Target location is determined by triangulation. If the sensors are not comparing measurement at the same time, an inaccurate position is computed.

FIG. 3 illustrates where two sensors 301 and 302, possibly a camera, can measure angle 304 and 305 to a target 303 but not range. Target location 306 is determined by triangulation. If the sensors 301 and 302 are not comparing measurements at the same time, an inaccurate position is computed.

A third application of the present invention is to provide synchronized signals for localization purposes. For example, one could postulate a large set of UAVs or UGVs that are too small (or too inexpensive) to carry a proper navigation unit or GPS (or they are located in a GPS-denied area). By having multiple, larger vehicles equipped with an IMU or GPS, as well as a synchronized atomic clock, the small devices can be localized by looking at the differences in time-of-flight of the signals from the known platforms. Many options for localization using these techniques are available, including quadrature detection, trilateration, and others.

A variation of this can improve ranging between two locations. A transmitter at the first location emits a signal that reaches a receiver at the second location some time later. The time difference is based on the time of flight of the signal, which is a function of distance. If a radio signal is used, the time of flight is the distance between the two locations divided by the speed of light in air.

Currently, the second location would have to transmit a signal back to the first location with a possible known retransmission delay, and round trip time is halved to determine one way time of flight. By having accurate clocks at both locations, the time of flight can be determined with only one signal being sent.

Figure 4:
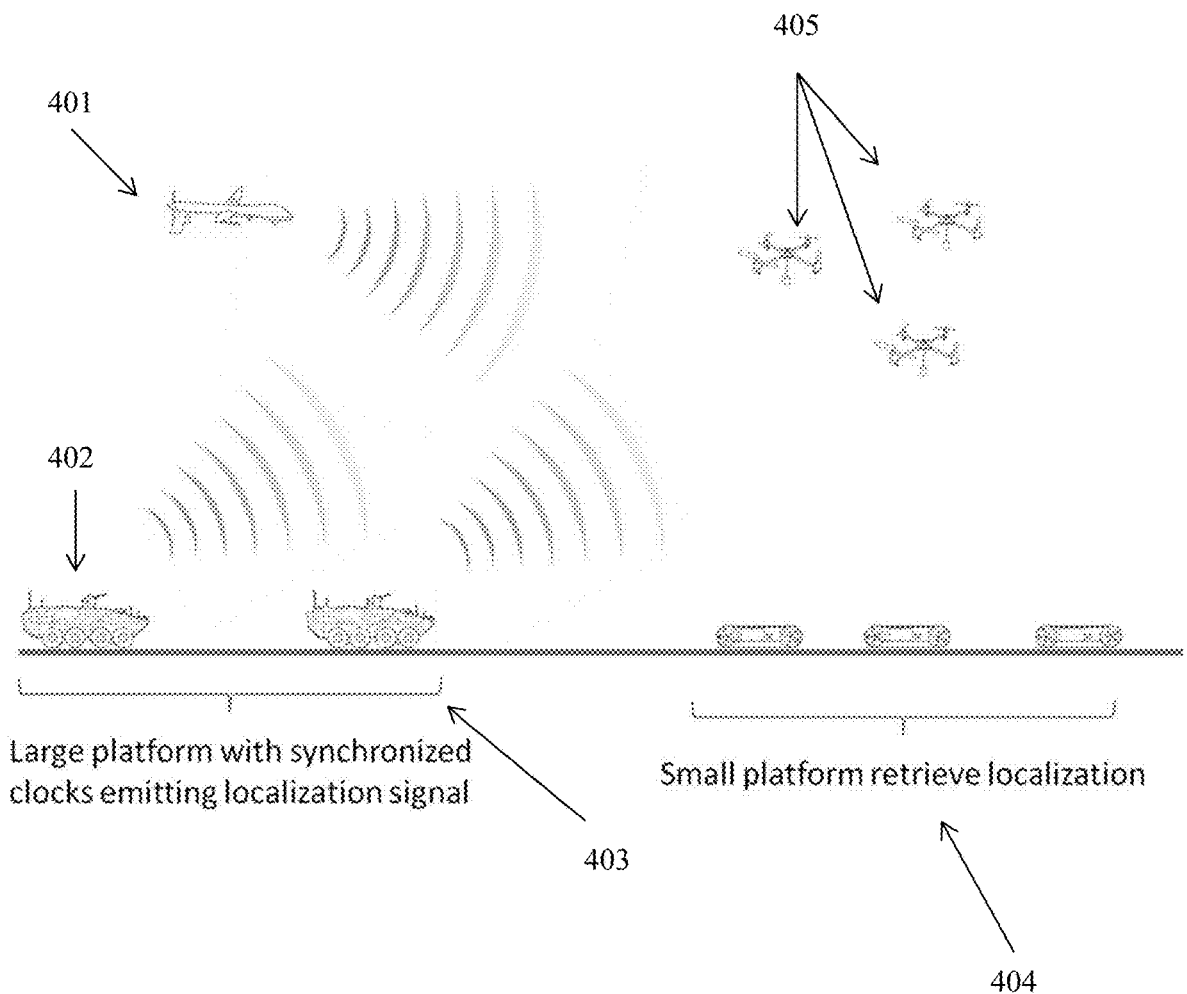
FIG. 4. Synchronized vehicles are used to provide one-way localization to smaller platforms. The emitters can be mobile or stationary at a fixed site. The emitters can be ground, air, sea or space based. Their locations can be known by external measurements (surveyed locations, accurate Inertial measurement unit, etc) or they can get their locations from other synchronized vehicles in the system.

FIG. 4 illustrates where synchronized vehicles 401, 402, and 403 are used to provide one-way localization to smaller platforms 404 and 405. The emitters can be mobile or stationary at a fixed site. The emitters can be ground, air, sea or space based. Their locations can be known by external measurements (surveyed locations, accurate inertial measurement unit, etc) or they can get their locations from other synchronized vehicles in the system.

The system is composed of an inertial navigation unit connected to an onboard, accurate clock (for example, an atomic clock in a chip). The combination of localization and time synchronization between the clocks is used to provide a variety of benefits, including improved on-the-move radar techniques, obfuscation, and third-party localization services on-the-move.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A radar system for detecting radar targets while obfuscating a location of at least one radar receiver, comprising:
    a plurality of vehicles, each vehicle comprising
    a localization device, a radar receiver device, and
    a vehicle atomic clock;
    a radar emitter device comprising a radar transmitter and an emitter atomic clock, wherein the radar emitter device is operable to (i) transmit a radar signal via the radar transmitter at a first time of the emitter atomic clock and (ii) synchronize the first time of the emitter atomic clock with the vehicle atomic clocks of the plurality of vehicles;
    wherein each of the vehicles of the plurality of vehicles is operable to receive, via the respective radar receiver devices, a reflection of the radar signal from a radar target and (a) calculate, based on the receiving of the reflected radar signal, a difference between the synchronized first time and a current time of the vehicle atomic clock, and (b) calculate, based on a location of the vehicle obtained by the localization device and the calculated difference, a relative location of the radar target.

2. The radar system of claim 1, wherein the radar emitter device is in motion.

3. The radar system of claim 1, wherein at least one of vehicles of the plurality of vehicles is in motion.

4. A method of operating a radar system employing a dynamically assembled RADAR beam-steering phased array, comprising:
    recording, by a first vehicle in a convoy of vehicles and utilizing a first navigation unit, a first location of the first vehicle, at a first time of a first atomic clock of the first vehicle;
    synchronizing the first atomic clock of the first vehicle with at least one second atomic clock of at least one second vehicle in the convoy;
    recording, by the at least one second vehicle in the convoy of vehicles and utilizing a second navigation unit, a second location of the at least one second vehicle, at the first time of the second atomic clock of the at least one second vehicle;
    computing, utilizing the recorded first and second locations, a phase shift for a beam-steering RADAR emission;
    emitting, in accordance with the computed phase shift for the beam-steering RADAR emission and by a first RADAR emitter of the first vehicle, a first RADAR emission; and emitting, in accordance with the computed phase shift for the beam-steering RADAR emission and by a second RADAR emitter of the at least one second vehicle, a second RADAR emission.

5. The method of claim 4, wherein at least one of the first and second navigation units comprises a GPS device.

6. The method of claim 4, wherein at least one of the first vehicle and the at least one second vehicle comprises a RADAR receiver device and wherein the method further comprises:

receiving, by the RADAR receiver, a reflection of a least one of the first and second RADAR emissions.

7. The method of claim 4, wherein at least one of first vehicle and the at least one second vehicle is in motion at the first time.

* * * * *